(12) United States Patent
Hayashi et al.

(10) Patent No.: US 12,157,837 B2
(45) Date of Patent: Dec. 3, 2024

(54) ADHESIVE COMPOSITION, METHOD FOR PRODUCING SURFACE-TREATED METAL MEMBER, AND METHOD FOR PRODUCING METAL-RESIN COMPOSITE BODY

(71) Applicant: MEC COMPANY LTD., Amagasaki (JP)

(72) Inventors: Tomoki Hayashi, Amagasaki (JP); Itsuro Tomatsu, Amagasaki (JP); Daisaku Akiyama, Amagasaki (JP)

(73) Assignee: MEC Company Ltd., Amagasaki (JP)

( * ) Notice: Subject to any disclaimer, the term of this patent is extended or adjusted under 35 U.S.C. 154(b) by 617 days.

(21) Appl. No.: 17/310,676

(22) PCT Filed: Jan. 9, 2020

(86) PCT No.: PCT/JP2020/000437
§ 371 (c)(1),
(2) Date: Aug. 17, 2021

(87) PCT Pub. No.: WO2020/170638
PCT Pub. Date: Aug. 27, 2020

(65) Prior Publication Data
US 2022/0073793 A1  Mar. 10, 2022

(30) Foreign Application Priority Data
Feb. 21, 2019 (JP) .................. 2019-029047

(51) Int. Cl.
| | | |
|---|---|---|
| C09J 11/06 | (2006.01) | |
| C09J 11/04 | (2006.01) | |
| C08K 3/16 | (2006.01) | |
| C08K 3/30 | (2006.01) | |
| C08K 5/3492 | (2006.01) | |

(52) U.S. Cl.
CPC .............. C09J 11/06 (2013.01); C09J 11/04 (2013.01); *C08K 3/16* (2013.01); *C08K 3/30* (2013.01); *C08K 2003/3081* (2013.01); *C08K 5/3492* (2013.01); *C09J 2203/326* (2013.01); *C09J 2400/163* (2013.01); *C09J 2463/006* (2013.01)

(58) Field of Classification Search
None
See application file for complete search history.

(56) References Cited

U.S. PATENT DOCUMENTS

| | | | | |
|---|---|---|---|---|
| 2014/0272441 A1* | 9/2014 | Kramer | ................... | C23C 22/34 427/372.2 |
| 2019/0127606 A1 | 5/2019 | Akiyama et al. | | |
| 2020/0040460 A1 | 2/2020 | Akiyama et al. | | |

FOREIGN PATENT DOCUMENTS

| | | |
|---|---|---|
| JP | 62-35843 A | 2/1987 |
| JP | 2005-23301 A | 1/2005 |
| JP | 2007-023353 A | 2/2007 |
| JP | 2009-068085 A | 4/2009 |
| JP | 2013-30702 A | 2/2013 |
| JP | 2016-513755 A | 5/2016 |
| JP | 2017-008414 A | 1/2017 |
| JP | 2017-203073 A | 11/2017 |
| JP | 2018-104785 A | 7/2018 |
| JP | 2018-115306 A | 7/2018 |
| JP | 2018-188715 A | 11/2018 |
| WO | 2006/088521 A2 | 8/2006 |
| WO | 2014/140857 A2 | 9/2014 |
| WO | 2018/032006 A1 | 2/2018 |

OTHER PUBLICATIONS

No author, Relevant screenshot from www.en.wikipedia.org/wiki/Triazole for cyclohexylethyltriazol, 2017. (Year: 2017).*
No author, Relevant screenshot from www.pubchem.ncbi.nlm.nih.gov/compound/Cyclohexyl-ethyl-triazol for cyclohexylethyltriazol, 2017. (Year: 2017).*
No author, Relevant screenshot from www.en.wikipedia.org/wiki/Thiazole for 1,3-thiazole, 2017. (Year: 2017).*
Nagatani, Y. et al., English machine-translation by Clarivate Analytics of JP2007023353A, with full JP patent attached, C23C22/20, Jul. 19, 2005. (Year: 2005).*
International Search Report issued for International Patent Application No. PCT/JP2020/000437, dated Feb. 25, 2020 in 3 pages.
International Preliminary Report on Patentability issued for International Patent Application No. PCT/JP2020/000437, dated Sep. 2, 2021 in 5 pages.
Rejection Decision issued in the corresponding Chinese Patent Application No. 202080007203.7, dated Apr. 30, 2023 in 8 pages including English translation.
Chinese Office Action issued in the corresponding Chinese Patent Application No. 202080007203.7, dated Jan. 5, 2023 in 13 pages including English translation.

(Continued)

*Primary Examiner* — S. Behrooz Ghorishi
*Assistant Examiner* — Gregory C. Grosso
(74) *Attorney, Agent, or Firm* — Knobbe, Martens, Olson & Bear, LLP

(57) ABSTRACT

An adhesive composition for forming an adhesive layer to be in contact with a resin on a surface of a metal, including: a low molecular weight organic compound having two or more nitrogen atoms in one molecule; and at least one metal ion selected from the group consisting of a trivalent aluminum ion and a trivalent chromium ion, wherein the resin is a curable resin, and the adhesive composition is an aqueous solution having a pH of 12 or less and has a concentration of the low molecular weight organic compound of 0.01 to 150 g/L and a molar concentration of the at least one metal ion of 0.005 to 100 mmol/L. The adhesive composition can improve adhesion between surfaces of multiple metals and a resin.

10 Claims, No Drawings

(56) References Cited

OTHER PUBLICATIONS

The Extended European Search Report issued for European Patent Application No. 20758771.8, dated Sep. 28, 2022 in 7 pages.
Office Action issued in the corresponding Singapore Patent Application No. 11202107824X, dated Oct. 25, 2023 in 6 pages.
Office Action dated Feb. 15, 2024 in Japanese Application No. 2021-501673 in 8 pages.

* cited by examiner

ADHESIVE COMPOSITION, METHOD FOR PRODUCING SURFACE-TREATED METAL MEMBER, AND METHOD FOR PRODUCING METAL-RESIN COMPOSITE BODY

CROSS-REFERENCE TO RELATED APPLICATIONS

This application is the U.S. National Phase under 35. U.S.C. § 371 of International Application PCT/JP2020/000437, filed Jan. 9, 2020, which claims priority to Japanese Patent Application No. 2019-029047, filed Feb. 21, 2019. The disclosures of the above-described applications are hereby incorporated by reference in their entirety.

TECHNICAL FIELD

The present invention relates to an adhesive composition, a method for producing a surface-treated metal member, and a method for producing a metal-resin composite body.

BACKGROUND ART

In the production process of an electronic substrate, a resin material such as an etching resist, a plating resist, a solder resist, a prepreg, and a sealing resin is bonded to the surface of a metal layer or a metal wiring. In the production process of an electronic substrate and the product after production, high adhesion between the metal and the resin is required. As a method for increasing adhesion between the metal and the resin, for example, a method of forming fine irregularities on the surface of the metal with a roughening agent (microetching agent), a method of forming a film (adhesive layer) for improving adhesion with a resin on the surface of the metal, and a method of forming an adhesive layer on a roughened surface are known.

For example, Patent Documents 1 and 2 disclose a film-forming composition for forming a film having excellent adhesion between a metal member and a resin.

PRIOR ART DOCUMENTS

Patent Documents

Patent Document 1: JP-A-2017-203073
Patent Document 2: JP-A-2018-115306

SUMMARY OF THE INVENTION

Problems to be Solved by the Invention

Meanwhile, in the lead frame immediately before the molding process in the field of electronic substrate production, there are surfaces of multiple metals such as copper, nickel, silver, aluminum, gold, tin, and lead of, for example, a bonding wire, a die pad, a bonding pad, and a heat sink. Though the film-forming compositions disclosed in Patent Documents described above have excellent adhesion between a metal member of copper or a copper alloy and a resin, there is room to improve the compositions so that the resin can simultaneously adhere to multiple metals described above.

The present invention has been made in view of the abovementioned circumstances, and an object of the present invention is to provide an adhesive composition capable of improving adhesion between surfaces of multiple metals and a resin.

Means for Solving the Problems

The present invention relates to an adhesive composition for forming an adhesive layer to be in contact with a resin on a surface of a metal, including: a low molecular weight organic compound having two or more nitrogen atoms in one molecule; and at least one metal ion selected from the group consisting of a trivalent aluminum ion and a trivalent chromium ion, wherein the resin is a curable resin, and the adhesive composition is an aqueous solution having a pH of 12 or less and has a concentration of the low molecular weight organic compound of 0.01 to 150 g/L and a molar concentration of the at least one metal ion of 0.005 to 100 mmol/L.

The present invention also relates to a method for producing a surface-treated metal member, including the step of: bringing a member having a surface of a metal into contact with the adhesive composition to form an adhesive layer on the surface.

Further, the present invention relates to a method for producing a metal-resin composite body, including the step of: bonding a resin member onto an adhesive layer of a surface-treated metal member obtained by the method for producing a surface-treated metal member.

Effect of the Invention

Though the details of the mechanism of action of the effect in the adhesive composition of the present invention are partially unknown, they are presumed as follows. However, the interpretation of the present invention does not have to be limited to this mechanism of action.

The adhesive composition of the present invention is used for forming an adhesive layer to be in contact with a resin on a surface of a metal, and the resin is a curable resin. The adhesive composition of the present invention includes a low molecular weight organic compound having two or more nitrogen atoms in one molecule; and at least one metal ion selected from the group consisting of a trivalent aluminum ion and a trivalent chromium ion, is an aqueous solution having a pH of 12 or less, and has a concentration of the low molecular weight organic compound of 0.01 to 150 g/L and a molar concentration of the at least one metal ion of 0.005 to 100 mmol/L. It is presumed that in the composition, a specific amount of the low molecular weight organic compound and a specific amount of the at least one metal ion construct a network in a self-integrated manner and form a dense film that is advantageous for adhesion, and thus adhesion between surfaces of multiple metals and a resin can be improved.

MODE FOR CARRYING OUT THE INVENTION

The adhesive composition of the present invention is an adhesive composition for forming an adhesive layer to be in contact with a resin on a surface of a metal, including: a low molecular weight organic compound having two or more nitrogen atoms in one molecule; and at least one metal ion selected from the group consisting of a trivalent aluminum ion and a trivalent chromium ion, wherein the resin is a curable resin, and the adhesive composition is an aqueous solution having a pH of 12 or less and has a concentration of the low molecular weight organic compound of 0.01 to 150 g/L and a molar concentration of the metal ion source of 0.005 to 100 mmol/L.

<Metal>

The metal of the present invention can be a metal that belongs to a transition element, a base metal element, or a metalloid element in the periodic table, and alloys thereof are also included. Examples of the transition element include titanium, vanadium, chromium, manganese, iron, cobalt, nickel, copper, zinc, zirconium, molybdenum, silver, tungsten, platinum, and gold. Examples of the base metal element include aluminum, indium, tin, and lead. Examples of the metalloid element include silicon and antimony. Among them, iron, copper, nickel, gold, silver, aluminum, and tin are preferable. Examples of the surface of a metal include a surface of a metal having an oxide film, a surface of a plated metal, and a surface of an activated metal. The surface of a metal can be smooth and roughened.

The surface of a metal is usually a member having a surface of a metal (metal member), and the shape of the member is not particularly limited. Examples of the shape of the member include a metal lump, a plate material, a bar material, and also include a desired shape obtained by machining by one of plastic working, saw working, milling, electrical discharge working, drilling, pressing, grinding, polishing, and the like singly, or in combination thereof.

Examples of the member/part having the metal member include a semiconductor wafer, an electronic substrate, a lead frame, a die pad, a bonding wire, a bonding pad, a bus bar, and a heat sink.

<Resin>

The resin of the present invention is a curable resin.

The curable resin is a resin formed from a resin composition that exhibits curing properties. Examples of the curable resin include a phenol resin, an epoxy resin, a urea resin, a melamine resin, an unsaturated polyester resin, a silicone resin, a polyurethane resin, a diallyl phthalate resin, an alkyd resin, an isocyanate resin, and a cyanoacrylate resin; a photocurable resin such as an acrylic resin; and a reactive curable resin composition such as rubber and elastomer. Among them, from the viewpoint of affinity, those containing a functional group such as a carboxyl group, a thiol group, a hydroxyl group, an epoxy group, an amino group, and a silyl group are preferable. The curable resin can be used singly or in combination of two or more types.

The curable resin can be a composition composed of the curable resin, or can be a composition containing the curable resin as a main component. The curable resin can be a composition containing additives such as various conventionally known inorganic/organic fillers, flame retardants, flame retardant aids, ultraviolet absorbers, heat stabilizers, light stabilizers, colorants, carbon black, processing aids, nucleating agents, release agents, plasticizers, and fibrous reinforcing materials as long as the effects of the present invention are not impaired.

<Low Molecular Weight Organic Compound Having Two or More Nitrogen Atoms in One Molecule>

The low molecular weight organic compound having two or more nitrogen atoms in one molecule of the present invention is a main component that forms an adhesive layer between a surface of a metal and a resin. The low molecular weight organic compound refers to components other than so-called high molecular weight organic compounds, and the molecular weight is not particularly limited. Examples of the upper limit of the molecular weight include 1500 or less and 1000 or less. The low molecular weight organic compound can be used singly or in combination of two or more types.

The low molecular weight organic compound is not particularly limited as long as the low molecular weight organic compound is a low molecular weight organic compound having two or more nitrogen atoms in one molecule because two or more nitrogen atoms in one molecule form a network in a self-integrated manner. Examples of the nitrogen atom-containing organic group include an amino group, an imino group, a nitro group, a nitroso group, an azo group, a hydrazo group, a diazo group, a cyano group, and a heterocyclic ring containing a nitrogen atom (nitrogen-containing heterocyclic ring). The low molecular weight organic compound is preferably a compound having an aromatic ring in the molecule, and more preferably a compound having a heterocyclic ring containing a nitrogen atom (nitrogen-containing heterocyclic ring).

Examples of the amino group-containing compound include monoamine compounds such as nitroaniline, cyanoaniline, and paraphenylazoaniline; diamine compounds such as ethylenediamine, diaminobenzoic acid, phenylenediamine, aminobenzothiazole, and piperazine; triamine compounds such as bishexamethylenetriamine, diethylenetriamine, and diaminoaniline; and polyamine compounds such as tetraamine compounds such as benzenetetraamine, triaminoethylamine, and biphenyltetramine. Among them, an amino group-containing compound having an aromatic ring in the molecule is preferable.

Examples of the imino group-containing compound include acetamidine hydrochloride and guanidine hydrochloride; examples of the nitro group-containing compound include dinitrofluorobenzene and dinitrophenol; examples of the nitroso group-containing compound include dinitrosobenzene and dimethylnitrosamine; examples of the azo group-containing compound include azobenzene dicarboxylic acid; examples of the hydrazo group-containing compound include hydrazobenzene and hydrazine; examples of the diazo group-containing compound include diazoacetic acid ester and benzenediazonium chloride; and examples of the cyano group-containing compound include dichlorodicyanobenzoquinone and a dicyanosilver salt.

In the compound having a nitrogen-containing heterocyclic ring, the heterocyclic ring can be a monocyclic ring or a fused ring, and the heterocyclic ring can contain an oxygen atom or a sulfur atom. Examples of the compound having a nitrogen-containing heterocyclic ring include monocyclic rings such as pyrrole, pyrazole, imidazole, triazole, tetrazole, oxazole, oxadiazole, isoxazole, thiazole, isothiazole, furazan, pyridine, pyridazine, pyrimidine, pyrazine, triazine, tetrazine, pentazine, azepine, diazepine, and triazepine; fused bicyclic rings such as indole, isoindole, thienoindole, indazole, purine, quinoline, isoquinoline, and benzotriazole; fused tricyclic rings such as carbazole, acridine, β-carboline, acridone, perimidine, phenazine, phenanthridine, phenothiazine, phenoxazine, and phenanthroline; fused tetracyclic rings such as quindoline and quinindoline; and fused pentacyclic rings such as acrindoline. Among them, nitrogen-containing heterocyclic rings containing two or more nitrogen atoms such as pyrazole, imidazole, triazole, tetrazole, pyridazine, pyrimidine, pyrazine, triazine, tetrazine, and pentazine are preferable, and imidazole, triazole, and triazine are particularly preferable.

As the low molecular weight organic compound having two or more nitrogen atoms in one molecule, for example, the following compounds having an amino group and a nitrogen-containing heterocyclic ring in one molecule described in JP-A-2017-203073 and JP-A-2018-115306 can be used.

[Formula 1]

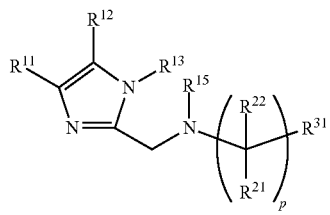

(I)

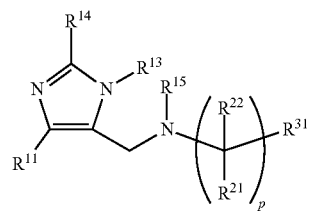

(II)

(in General Formulas (I) and (II), $R^{11}$ to $R^{15}$ are each independently a hydrogen atom, or an alkyl group having 1 to 20 carbon atoms, an allyl group, a benzyl group, or an aryl group. $R^{21}$ and $R^{22}$ each independently represent a hydrogen atom, an alkyl group having 1 to 4 carbon atoms, a hydroxy group, or a methoxy group, and p is an integer of 0 to 16. $R^{31}$ is a primary amino group (—$NH_2$), or an alkoxysilyl group or a hydroxysilyl group represented by $-Si(OR^{41})_k R^{42}_{(3-k)}$ (k is an integer of 1 to 3, and $R^{41}$ and $R^{42}$ are each independently a hydrogen atom or an alkyl group having 1 to 6 carbon atoms.))

[Formula 2]

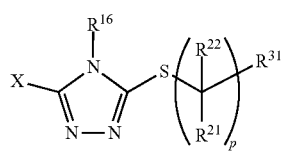

(III)

(In General Formula (III), $R^{21}$ and $R^{22}$, $R^{31}$, and p are the same as those in General Formulas (I) and (II) above. $R^{16}$ is a hydrogen atom, or an alkyl group having 1 to 20 carbon atoms, an allyl group, a benzyl group, or an aryl group. X is a hydrogen atom, a methyl group, —$NH_2$, —SH, or —$SCH_3$, and —$NH_2$ is particularly preferable.)

[Formula 3]

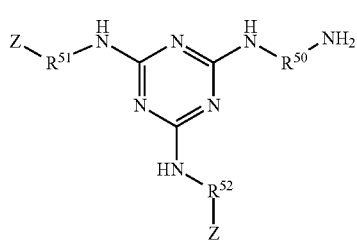

(IV)

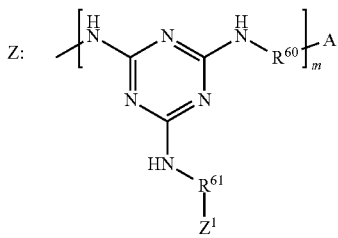

(In General Formula (IV), $R^{50}$, $R^{51}$, $R^{52}$, $R^{60}$, and $R^{61}$ are each independently any divalent group, and are, for example, a substituted or unsubstituted alkylene group optionally having a branch having 1 to 6 carbon atoms. The alkylene group can contain an ether, a carbonyl, a carboxy, an amide, an imide, a carbamide, a carbamate, or the like at a terminal or between carbon and carbon. $Z^1$ is the same group as Z. m and n are each independently an integer of 0 to 6. The end group A is a hydrogen atom, a primary amino group (—$NH_2$), or an alkoxysilyl group or a hydroxysilyl group represented by —$Si(OR^{41})_k R^{42}_{(3-k)}$ (k is an integer of 1 to 3, and $R^{41}$ and $R^{42}$ are each independently a hydrogen atom or an alkyl group having 1 to 6 carbon atoms.))

A compound in which, in General Formula (IV) above, both of two Zs have m=0 and the end group A is an amino group is represented by Formula (V) below.

[Formula 4]

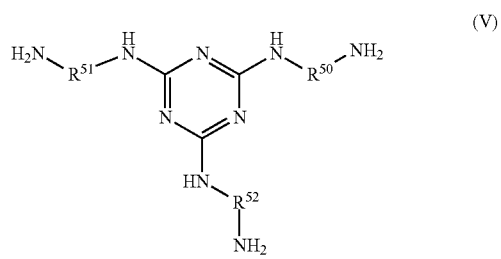

(V)

A compound in which, in General Formula (IV) above, one Z of two Zs has m=0 and the end group A is an amino group, and the other Z has m=0 and the end group A is a trialkoxysilyl group is represented by Formula (VI) below.

[Formula 5]

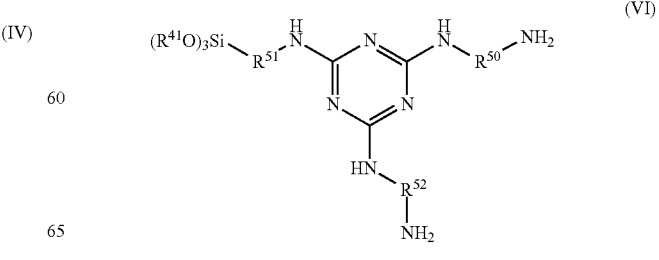

(VI)

-continued

[Formula 6]

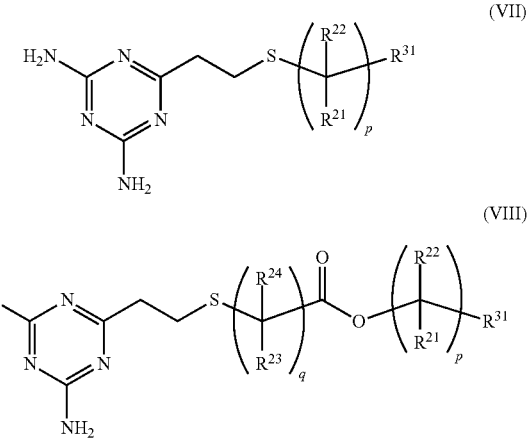

(In General Formulas (VII) and (VIII), $R^{21}$ to $R^{24}$ each independently represent a hydrogen atom, an alkyl group having 1 to 4 carbon atoms, a hydroxy group, or a methoxy group. $R^{31}$ is a primary amino group (—$NH_2$), or an alkoxysilyl group or a hydroxysilyl group represented by —Si$(OR^{41})_k R^{42}_{(3-k)}$ (k is an integer of 1 to 3, and $R^{41}$ and $R^{42}$ are each independently a hydrogen atom or an alkyl group having 1 to 6 carbon atoms.). p is an integer of 0 to 16, and q is 1 or 2.)

<Metal Ion>

The metal ion of the present invention is at least one selected from the group consisting of a trivalent aluminum ion and a trivalent chromium ion. The metal ion can be used singly or in combination of two or more types.

For the metal ion, a metal ion organic salt or a metal ion inorganic salt is usually used as a metal ion source. Examples of the organic salt include formic acid, acetic acid, malonate, benzoate, phenate, citrate, and amino acid salt. Examples of the inorganic salt include a chloride, a bromide, a carbonate, a sulfate, a phosphate, a nitrate, and a hydroxide.

The adhesive composition of the present invention is an aqueous solution having a pH of 12 or less. The medium contained in the adhesive composition can be ion-exchanged water, pure water, distilled water, or industrial water having water as a main component, and can be, for example, water containing an organic solvent. Examples of the organic solvent include alcohols, esters, ethers, ketones, and aromatic hydrocarbons. When water containing an organic solvent is used, the percentage of the organic solvent in the medium is preferably 15 wt % or less, more preferably 10 wt % or less, and still more preferably 5 wt % or less. The pH can be appropriately determined because the solubility varies depending on the type of metal ions. The pH is preferably 2 to 11, more preferably 3 to 10, and still more preferably 4 to 9 from the viewpoint of improving the adhesion between the surfaces of multiple metals and a curable resin. The pH can be adjusted using various pH adjustors such as acids and alkalis without particular limitation.

The concentration of the low molecular weight organic compound is 0.01 to 150 g/L in the adhesive composition. The concentration of the low molecular weight organic compound is preferably 100 g/L or less, more preferably 50 g/L or less, and still more preferably 35 g/L or less in the adhesive composition from the viewpoint of good film formability of the adhesive layer, and the concentration of the low molecular weight organic compound is preferably 0.1 g/L or more, and more preferably 0.8 g/L wt % or more in the adhesive composition from the viewpoint of efficiently securing the film thickness of the adhesive layer after coating.

The molar concentration of the metal ion is 0.005 to 100 mmol/L in the adhesive composition. The molar concentration of the metal ion is preferably 50 mmol/L or less, and more preferably 20 mmol/L or less in the adhesive composition from the viewpoint of preventing adhesion inhibition by the metal salt deposited after coating, and the molar concentration of the metal ion is preferably 0.01 mmol/L or more, and more preferably 0.1 mmol/L or more in the adhesive composition from the viewpoint of formation of a network in a self-integrated manner.

The total percentage of the low molecular weight organic compound and the metal ion source is preferably 50 wt % or more, more preferably 70 wt % or more, still more preferably 80 wt % or more, still more preferably 90 wt % or more, and still more preferably 95 wt % or more in the solid content of the adhesive composition.

The adhesive composition of the present invention can contain additives. Examples of the additives include stabilizers such as antioxidants and preservatives, viscosity modifiers, and colorants.

<Method for Producing Surface-Treated Metal Member>

The method for producing a surface-treated metal member of the present invention includes the step of bringing the member having a surface of a metal (metal member) into contact with the adhesive composition and drying and removing the medium as needed to form an adhesive layer on the surface. The thickness of the adhesive layer is preferably 20 μm or less, more preferably 10 μm or less, and still more preferably 5 μm or less.

As the method for bringing the member having a surface of a metal into contact with the adhesive composition, various known contacting (applying or coating) methods can be applied, and examples thereof include brush coating, dip coating, spray coating, bar coating, roll coating, film applicator, spin coating, screen printing, and transfer.

<Method for Producing Metal-Resin Composite Body>

The method for producing a metal-resin composite body of the present invention includes the step of bonding the member of a resin (resin member) onto an adhesive layer of a surface-treated metal member obtained by the method for producing a surface-treated metal member.

As the bonding method, lamination pressing, injection molding, extrusion molding, hot press molding, compression molding, transfer molding, casting molding, laser welding molding, Reaction Injection Molding (RIM molding), Liquid Injection Molding (LIM molding), and the like can be employed. As the molding conditions of the metal-resin composite body, known conditions can be employed depending on the resin used.

In the method for producing a surface-treated metal member and the method for producing a metal-resin composite body of the present invention, other steps such as a degreasing step, a cleaning step, a water washing step, an ultrasonic cleaning step, a heat treatment step, and a drying step can be appropriately employed as needed. By performing a heat treatment step after the bonding, the adhesion between the metal and the resin can be increased.

The adhesive layer formed from the adhesive composition of the present invention is excellent in adhesion between the surface of a metal and the curable resin, and thus the surface of a metal and the curable resin can be directly bonded without interposition of another layer. In particular, when the surface of a metal is surfaces of two or more types of metals, the adhesive composition of the present invention is suitable because the curable resin is capable of simultaneously adhering to the two or more types of metals (multiple metals). The surfaces of two or more types of metals are surfaces of different metals, and the different metals mean that the main components of the metals are different. For example, the surface of copper, the surface of copper plating, and the surface of a copper alloy belong to the surface of the same metal because they have copper as the main component.

EXAMPLES

Examples of the present invention will be described together with Comparative Examples. However, the present invention is not to be construed as being limited to the following Examples.

Examples 1 to 36 and Comparative Examples 1 to 34

<Preparation of Adhesive Composition>

In Examples and Comparative Examples, each component shown in Table 2 or 3 was dissolved in ion-exchanged water so that the compounding amount (g/L) shown in Table 2 or 3 would be achieved, and then acetic acid or ammonia was added so that the pH shown in Table 2 or 3 would be achieved, thereby a solution (adhesive composition) was prepared. The metal ion concentration (mmol/L) was measured by using ICP (Model No. "PS3520UVDD II", manufactured by Hitachi High-Tech Corporation) instrument and performing calibration with a standard solution ("Multi-Element Standard IV" manufactured by Merck KGaA) diluted 5000 times, 1000 times, or 500 times. The sample was appropriately diluted, and the metal concentration was measured. However, titanium ions were calibrated with a titanium standard solution (1,000 ppm) manufactured by FUJIFILM Wako Pure Chemical Corporation.

<Production of Surface-Treated Metal Member and Metal-Resin Composite Body>

The solution (adhesive composition) obtained above was applied to a surface of each metal shown in Table 2 or 3 using an air brush ("Spraywork HG Single Air Brush" manufactured by TAMIYA, INC.), and then dried with a dryer for 30 seconds to form an adhesive layer on the surface of each metal, thereby surface-treated metal members (2 members in total) were produced. An epoxy resin ("G2 Epoxy Resin", manufactured by Gatan, Inc.) as a curable resin was applied to the adhesive layer surface of the obtained surface-treated metal member in a thickness of 0.2 mm, then the adhesive layer surface was bonded to the adhesive layer surface of the other surface-treated metal member (adhered area: 50 mm$^2$), and the curable resin was cured by thermocompression (conditions: 100° C., 10 kPa, 2 hours) to produce a metal-resin composite body.

<Evaluation of Bonding Strength (Adhesive Strength)>

The bonding strength (adhesive strength) of the metal-resin composite body obtained above was evaluated according to the following criteria by measuring the shear strength (MPa) at a tensile speed of 3 mm/min using Autograph ("AGX-10kNX" manufactured by Shimadzu Corporation). The results are shown in Tables 2 and 3. In Reference Examples 1 to 8 below, metal members were bonded to each other with the curable resin interposed therebetween under the above conditions without using the above solution (adhesive composition) to produce a metal-resin composite body, and the shear strength (MPa) was measured.

⊚: The shear strength (MPa) is 190% or more as compared with the shear strength value in Reference Example (comparison with the same metal).
○: The shear strength (MPa) is 160% or more and less than 190% as compared with the shear strength value in Reference Example (comparison with the same metal).
•: The shear strength (MPa) is 145% or more and less than 160% as compared with the shear strength value in Reference Example (comparison with the same metal).
Δ: The shear strength (MPa) is 130% or more and less than 145% as compared with the shear strength value in Reference Example (comparison with the same metal).
x: The shear strength (MPa) is less than 130% as compared with the shear strength value in Reference Example (comparison with the same metal).

TABLE 1

|  | Surface of metal | Curable resin | Adhesive strength (MPa) |
| --- | --- | --- | --- |
| Reference Example 1 | Ni | Epoxy resin | 6.7 |
| Reference Example 2 | Cu | Epoxy resin | 6.9 |
| Reference Example 3 | Ag | Epoxy resin | 6.5 |
| Reference Example 4 | Al | Epoxy resin | 7.6 |
| Reference Example 5 | Fe | Epoxy resin | 6.4 |
| Reference Example 6 | Sn | Epoxy resin | 7.2 |
| Reference Example 7 | Au | Epoxy resin | 6.2 |
| Reference Example 8 | Si | Epoxy resin | 6.6 |

| Example | Low molecular weight organic compound | Metal ion source | Amount of organic compound (g/L) | Amount of metal ion source (g/L) | Metal ion concentration (mmol/L) | pH | Surface of metal | Adhesive strength (MPa) | Judgement |
| --- | --- | --- | --- | --- | --- | --- | --- | --- | --- |
| 1 | Triazine compound a | Aluminum sulfate | 4.5 | 0.60 | 1.68 | 7 | Ni | 13.0 | ⊚ |
| 2 | Triazine compound a | Chromium (III) chloride | 4.5 | 0.50 | 1.90 | 7 | Ni | 12.4 | ○ |
| 3 | Triazine compound a | Aluminum sulfate | 30.0 | 0.015 | 0.05 | 6 | Cu | 11.6 | ○ |
| 4 | Triazine compound a | Chromium (III) chloride | 30.0 | 0.015 | 0.05 | 6 | Cu | 11.7 | ○ |
| 5 | Triazine compound b | Aluminum sulfate | 8.5 | 1.50 | 4.30 | 4 | Ag | 13.2 | ⊚ |
| 6 | Triazine compound b | Chromium (III) chloride | 8.5 | 1.30 | 4.91 | 4 | Ag | 12.7 | ⊚ |
| 7 | Triazine compound b | Aluminum sulfate | 0.4 | 0.10 | 0.34 | 5 | Al | 14.2 | ○ |
| 8 | Triazine compound b | Chromium (III) chloride | 0.4 | 0.10 | 0.35 | 5 | Al | 13.4 | ○ |
| 9 | Triazine compound b | Aluminum acetate | 0.05 | 0.005 | 0.02 | 5 | Fe | 11.4 | ○ |
| 10 | Triazine compound b | Chromium (III) potassium sulfate | 0.05 | 0.005 | 0.01 | 5 | Fe | 10.5 | ○ |
| 11 | Triazole compound | Aluminum sulfate | 4.2 | 0.80 | 2.30 | 11 | Sn | 10.8 | • |
| 12 | Triazole compound | Chromium (III) chloride | 4.2 | 0.70 | 2.81 | 11 | Sn | 10.2 | Δ |
| 13 | Imidazole compound | Aluminum sulfate | 20.0 | 0.30 | 0.90 | 5 | Au | 11.5 | ○ |
| 14 | Imidazole compound | Chromium (III) chloride | 20.0 | 0.25 | 0.91 | 5 | Au | 11.0 | ○ |

-continued

| Example | Low molecular weight organic compound | Metal ion source | Amount of organic compound (g/L) | Amount of metal ion source (g/L) | Metal ion concentration (mmol/L) | pH | Surface of metal | Adhesive strength (MPa) | Judgement |
|---|---|---|---|---|---|---|---|---|---|
| 15 | Imidazole compound | Aluminum acetate | 15.0 | 0.15 | 0.59 | 2 | Ni | 10.4 | ● |
| 16 | Imidazole compound | Chromium (III) potassium sulfate | 15.0 | 0.25 | 0.47 | 2 | Ni | 9.9 | ● |
| 17 | Thiazole compound | Aluminum sulfate | 20.0 | 8.00 | 26.92 | 5 | Si | 9.8 | ● |
| 18 | Thiazole compound | Chromium (III) chloride | 20.0 | 7.00 | 26.97 | 5 | Si | 9.5 | Δ |
| 19 | Oxazoline compound | Aluminum acetate | 5.0 | 0.05 | 0.18 | 8 | Ag | 11.0 | ○ |
| 20 | Oxazoline compound | Chromium (III) potassium sulfate | 5.0 | 0.10 | 0.21 | 8 | Ag | 10.5 | ○ |
| 21 | Diamine compound a | Aluminum sulfate | 19.0 | 1.00 | 2.87 | 7 | Cu | 10.6 | ● |
| 22 | Diamine compound a | Chromium (III) chloride | 19.0 | 0.80 | 3.15 | 7 | Cu | 10.1 | ● |
| 23 | Diamine compound b | Aluminum sulfate | 15.0 | 5.00 | 15.61 | 10 | Fe | 8.4 | Δ |
| 24 | Diamine compound b | Chromium (III) chloride | 15.0 | 4.00 | 14.26 | 10 | Fe | 8.4 | Δ |
| 25 | Dicyano compound | Aluminum sulfate | 40.0 | 0.20 | 0.69 | 5 | Au | 8.8 | Δ |
| 26 | Dicyano compound | Chromium (III) chloride | 40.0 | 0.15 | 0.56 | 5 | Au | 9.2 | ● |
| 27 | Dicyano compound | Aluminum acetate | 85.0 | 0.13 | 0.54 | 5 | Ni | 9.2 | Δ |
| 28 | Dicyano compound | Chromium (III) potassium sulfate | 85.0 | 0.25 | 0.45 | 5 | Ni | 8.8 | Δ |
| 29 | Dinitro compound | Aluminum sulfate | 2.0 | 0.03 | 0.10 | 7 | Al | 11.7 | ● |
| 30 | Dinitro compound | Chromium (III) chloride | 2.0 | 0.03 | 0.11 | 7 | Al | 11.6 | ● |
| 31 | Dinitro compound | Aluminum sulfate | 1.0 | 0.15 | 0.48 | 3 | Cu | 9.0 | Δ |
| 32 | Dinitro compound | Chromium (III) chloride | 1.0 | 0.15 | 0.55 | 3 | Cu | 9.0 | Δ |
| 33 | Diamide compound | Aluminum sulfate | 25.0 | 0.15 | 0.44 | 6 | Sn | 10.5 | ● |
| 34 | Diamide compound | Chromium (III) chloride | 25.0 | 0.15 | 0.54 | 6 | Sn | 10.7 | ● |
| 35 | Diamide compound | Aluminum sulfate | 9.4 | 0.60 | 2.06 | 8 | Ni | 10.0 | ● |
| 36 | Diamide compound | Chromium (III) chloride | 9.4 | 0.60 | 2.31 | 8 | Ni | 10.6 | ● |

| Comparative Example | Low molecular weight organic compound | Metal ion source | Amount of organic compound (g/L) | Amount of metal ion source (g/L) | Metal ion concentration (mmol/L) | pH | Surface of metal | Adhesive strength (MPa) | Judgement |
|---|---|---|---|---|---|---|---|---|---|
| 1 | Triazine compound a | Basic ferric acetate | 4.6 | 0.40 | 1.97 | 7 | Ni | 8.2 | X |
| 2 | Triazine compound a | 24% aqueous titanium (IV) sulfate solution | 30.0 | 0.05 | 0.05 | 6 | Cu | 7.1 | X |
| 3 | Triazine compound b/ citric acid | Potassium bromide | 13.0 | 3.00 | 12.50 | 7 | Ag | 8.0 | X |
| 4 | Triazine compound b | Copper (II) sulfate | 0.4 | 0.08 | 0.30 | 5 | Al | 8.1 | X |
| 5 | Triazine compound b | Zinc chloride | 0.05 | 0.004 | 0.02 | 5 | Fe | 7.2 | X |
| 6 | Triazole compound | Sodium sulfate | 5.0 | 0.40 | 2.70 | 11 | Sn | 7.8 | X |
| 7 | Imidazole compound | 24% aqueous titanium (IV) sulfate solution | 20.0 | 1.00 | 0.99 | 5 | Au | 7.2 | X |
| 8 | Imidazole compound | — | 15.0 | 0.00 | 0.00 | 2 | Ni | 7.0 | X |
| 9 | Thiazole compound | Magnesium sulfate | 22.0 | 6.00 | 24.15 | 5 | Si | 6.3 | X |
| 10 | Oxazoline compound | Copper (II) sulfate | 5.0 | 0.05 | 0.20 | 8 | Ag | 7.3 | X |
| 11 | Diamine compound a | Copper (II) sulfate | 20.0 | 0.75 | 2.73 | 7 | Cu | 8.2 | X |
| 12 | Diamine compound b | — | 20.0 | 0.00 | 0.00 | 10 | Fe | 6.4 | X |
| 13 | Dicyano compound | 24% aqueous titanium (IV) sulfate solution | 40.0 | 0.50 | 0.45 | 5 | Au | 6.6 | X |
| 14 | Dicyano compound | Copper (II) sulfate | 85.0 | 0.10 | 0.42 | 5 | Ni | 7.0 | X |
| 15 | Dinitro compound | Magnesium sulfate | 2.0 | 0.03 | 0.11 | 7 | Al | 7.2 | X |
| 16 | Dinitro compound | Zinc chloride | 1.0 | 0.10 | 0.57 | 3 | Cu | 7.1 | X |
| 17 | Diamide compound | Sodium sulfate | 30.0 | 0.10 | 0.61 | 6 | Sn | 7.5 | X |
| 18 | Diamide compound | Basic ferric acetate | 10.0 | 0.40 | 1.84 | 8 | Ni | 7.3 | X |
| 19 | Amine compound a | Aluminum sulfate | 15.0 | 0.10 | 0.33 | 5 | Cu | 6.6 | X |
| 20 | Amine compound a | Chromium (III) chloride | 15.0 | 0.10 | 0.36 | 5 | Cu | 6.5 | X |
| 21 | Amine compound b | Aluminum acetate | 10.0 | 0.10 | 0.42 | 7 | Al | 8.9 | X |
| 22 | Amine compound b | Chromium (III) potassium sulfate | 10.0 | 0.25 | 0.50 | 7 | Al | 7.3 | X |
| 23 | Triazine compound a | Aluminum sulfate | 4.0 | 0.60 | 0.96 | 13 | Ag | 6.8 | X |
| 24 | Triazine compound a | Chromium (III) chloride | 5.0 | 0.25 | 1.01 | 13 | Ag | 7.4 | X |
| 25 | Oxazoline compound | Aluminum sulfate | 200.0 | 0.03 | 0.09 | 5 | Au | 7.6 | X |
| 26 | Oxazoline compound | Chromium (III) chloride | 200.0 | 0.03 | 0.10 | 5 | Au | 7.2 | X |
| 27 | Diamine compound a | Aluminum sulfate | 5.0 | 0.001 | 0.003 | 4 | Fe | 6.8 | X |
| 28 | Diamine compound a | Chromium (III) chloride | 5.0 | 0.001 | 0.003 | 4 | Fe | 6.4 | X |
| 29 | Diamide compound | Aluminum sulfate | 100.0 | 40.00 | 129.10 | 4 | Ni | 7.0 | X |
| 30 | Diamide compound | Chromium (III) chloride | 100.0 | 32.00 | 111.67 | 4 | Ni | 6.3 | X |
| 31 | Diamide compound | Aluminum sulfate | 0.005 | 0.002 | 0.006 | 7 | Si | 6.3 | X |
| 32 | Diamide compound | Chromium (III) chloride | 0.005 | 0.002 | 0.007 | 7 | Si | 7.1 | X |
| 33 | — | Aluminum sulfate | 0.0 | 1.50 | 5.08 | 4 | Al | 5.8 | X |
| 34 | — | Chromium (III) chloride | 0.0 | 2.50 | 9.29 | 4 | Al | 5.6 | X |

For each component in Tables 2 and 3,
the triazine compound a represents 1,3,5-triazine-2,4,6-trithiol;
the triazine compound b represents a compound represented by

[Formula 7]

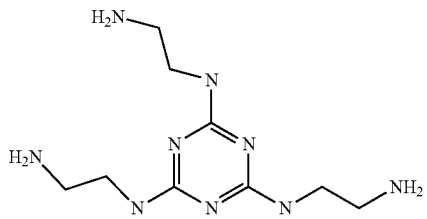

the triazole compound represents 3-amino-1,2,4-triazole;
the imidazole compound represents 2-(2,4-dichlorobenzyl)benzimidazole;
the thiazole compound represents aminobenzothiazole;
the oxazoline compound represents 2,2'-bis(2-oxazoline);
the diamine compound a represents diaminobenzoic acid;
the diamine compound b represents ethylenediamine;
the dicyano compound represents 2,3-dichloro-5,6-dicyano-1,4-benzoquinone;
the dinitro compound represents 2,4-dinitrofluorobenzene;
the diamide compound represents malonamide;
the amine compound a represents 3-aminopropyltriethoxysilane; and
the amine compound b represents glycine.
For the metals in Tables 1 to 3,
Ni (nickel) represents a C194 copper alloy plate plated with bright nickel sulfamate subjected to a cleaning treatment by $O_2$ plasma treatment, a degreasing treatment by immersion in dilute sulfuric acid (120 seconds), a water washing treatment (30 seconds), and a drying treatment by a dryer (30 seconds);
Cu (copper) represents a C7025 copper alloy plate subjected to a degreasing treatment by immersion in dilute sulfuric acid (20 seconds), a water washing treatment (30 seconds), and a drying treatment by a dryer (30 seconds);
Ag (silver) represents a C194 copper alloy plate plated with matt silver methanesulfonate subjected to a degreasing treatment by immersion in dilute nitric acid (20 seconds), a water washing treatment (30 seconds), and a drying treatment by a dryer (30 seconds);
Al (aluminum) represents an A5052 aluminum alloy plate subjected to a degreasing treatment by immersion in an alkaline surface treatment agent ("CA-5372", manufactured by MEC Co., Ltd.) (120 seconds), a water washing treatment (30 seconds), and a drying treatment by a dryer (30 seconds);
Fe (iron) represents SUS304 subjected to a cleaning treatment by $O_2$ plasma treatment, a degreasing treatment by immersion in dilute sulfuric acid (120 seconds), a water washing treatment (30 seconds), and a drying treatment by a dryer (30 seconds);
An (tin) represents a rolled tin plate subjected to a cleaning treatment by $O_2$ plasma treatment, a degreasing treatment by immersion in dilute sulfuric acid (120 seconds), a water washing treatment (30 seconds), and a drying treatment by a dryer (30 seconds);
Au (gold) represents a C194 copper alloy plate plated with bright nickel sulfamate subjected to additional gold plating treatment, and then subjected to a cleaning treatment by $O_2$ plasma treatment, a degreasing treatment by immersion in dilute sulfuric acid (120 seconds), a water washing treatment (30 seconds), and a drying treatment by a dryer (30 seconds); and
Si (silicon) represents a single crystal silicon wafer subjected to a cleaning treatment by $O_2$ plasma treatment, a degreasing treatment by immersion in dilute sulfuric acid (120 seconds), a water washing treatment (30 seconds), and a drying treatment by a dryer (30 seconds).

Examples 37 to 48

<Preparation of Adhesive Composition, Production of Surface-Treated Metal Member and Metal-Resin Composite Body>

In each Example, the adhesive composition shown in Table 5 was applied to a surface of each metal shown in Table 5 using an air brush ("Spraywork HG Single Air Brush" manufactured by TAMIYA, INC.), and then dried with a dryer for 30 seconds to form an adhesive layer on the surface of each metal, thereby surface-treated metal members (2 members in total) were produced. An unsaturated polyester resin ("Cold mounting resin No. 105", manufactured by Marumoto Struers K.K.), a cyanoacrylate resin ("Aron Alpha for general use", manufactured by TOAGOSEI CO., LTD.), a silicone resin ("Busbond Q #04884", manufactured by Konishi Co., Ltd.), or a polyurethane resin ("Shoe doctor N", manufactured by CEMEDINE Co., Ltd.) as a curable resin was applied to the adhesive layer surface of the obtained surface-treated metal member in a thickness of 0.2 mm, then the adhesive layer surface was bonded to the adhesive layer surface of the other surface-treated metal member (adhered area: 50 mm$^2$), and the curable resin was cured by thermocompression (conditions: 100° C., 10 kPa, 2 hours) to produce a metal-resin composite body.

<Evaluation of Bonding Strength (Adhesive Strength)>

The bonding strength (adhesive strength) of the metal-resin composite body obtained above was evaluated according to the following criteria by measuring the shear strength (MPa) at a tensile speed of 3 mm/min using Autograph ("AGX-10kNX" manufactured by Shimadzu Corporation). The results are shown in Table 5. In Reference Examples 9 to 20 below, metal members were bonded to each other with the curable resin interposed therebetween under the above conditions without using the above solution (adhesive composition) to produce a metal-resin composite body, and the shear strength (MPa) was measured.

⊚: The shear strength (MPa) is 190% or more as compared with the shear strength value in Reference Example (comparison with the same metal and the same curable resin).

○: The shear strength (MPa) is 160% or more and less than 190% as compared with the shear strength value in Reference Example (comparison with the same metal and the same curable resin).

•: The shear strength (MPa) is 145% or more and less than 160% as compared with the shear strength value in Reference Example (comparison with the same metal and the same curable resin).

Δ: The shear strength (MPa) is 130% or more and less than 145% as compared with the shear strength value in Reference Example (comparison with the same metal and the same curable resin).

x: The shear strength (MPa) is less than 130% as compared with the shear strength value in Reference Example (comparison with the same metal and the same curable resin).

TABLE 4

| | Surface of metal | Curable resin | Adhesive strength (MPa) |
|---|---|---|---|
| Reference Example 9 | Ni | Unsaturated polyester | 2.4 |
| Reference Example 10 | Ag | Unsaturated polyester | 2.3 |
| Reference Example 11 | Sn | Cyanoacrylate | 7.1 |
| Reference Example 12 | Au | Silicone | 1.4 |
| Reference Example 13 | Si | Polyurethane | 5.8 |
| Reference Example 14 | Ag | Cyanoacrylate | 6.1 |
| Reference Example 15 | Cu | Cyanoacrylate | 7.1 |
| Reference Example 16 | Fe | Unsaturated polyester | 2.1 |
| Reference Example 17 | Au | Unsaturated polyester | 2.3 |
| Reference Example 18 | Al | Silicone | 1.2 |
| Reference Example 19 | Sn | Polyurethane | 6.5 |
| Reference Example 20 | Ni | Cyanoacrylate | 5.3 |

TABLE 5

| Example | Adhesive composition | Surface of metal | Curable resin | Adhesive strength (MPa) | Judgement |
|---|---|---|---|---|---|
| 37 | Same as in Example 1 | Ni | Unsaturated polyester | 4.2 | ○ |
| 38 | Same as in Example 5 | Ag | Unsaturated polyester | 4.6 | ⊙ |
| 39 | Same as in Example 12 | Sn | Cyanoacrylate | 10.4 | ● |
| 40 | Same as in Example 13 | Au | Silicone | 2.3 | ○ |
| 41 | Same as in Example 18 | Si | Polyurethane | 8.3 | Δ |
| 42 | Same as in Example 19 | Ag | Cyanoacrylate | 9.4 | ● |
| 43 | Same as in Example 21 | Cu | Cyanoacrylate | 10.3 | ● |
| 44 | Same as in Example 23 | Fe | Unsaturated polyester | 2.9 | Δ |
| 45 | Same as in Example 25 | Au | Unsaturated polyester | 3.1 | Δ |
| 46 | Same as in Example 30 | Al | Silicone | 1.7 | Δ |
| 47 | Same as in Example 33 | Sn | Polyurethane | 9.2 | Δ |
| 48 | Same as in Example 36 | Ni | Cyanoacrylate | 7.7 | ● |

Examples 49 to 53

In each Example, a solution (adhesive composition) was prepared using the components shown in Table 6 in the same manner as in Example 1 described above to produce a metal-resin composite body. Then, a heat treatment step was performed under the conditions shown in Table 6, and the bonding strengths before and after the heat treatment were evaluated by the above-mentioned method. The results are shown in Table 6.

What is claimed is:

1. An adhesive composition for forming an adhesive layer to be in contact with a resin on a surface of a metal, comprising:
   a low molecular weight organic compound having two or more nitrogen atoms in one molecule; and
   at least one trivalent aluminum ion,
   wherein the low molecular weight organic compound and the at least one trivalent aluminum ion form the adhesive layer,
   wherein the resin is a curable resin, and the adhesive composition is an aqueous solution having a pH of 12 or less and has a concentration of the low molecular weight organic compound of 0.01 to 150 g/L and a molar concentration of the at least one metal ion of 0.005 to 100 mmol/L.

2. The adhesive composition according to claim 1, wherein the low molecular weight organic compound is a compound having an aromatic ring.

3. The adhesive composition according to claim 1, wherein the low molecular weight organic compound is a compound having a nitrogen-containing heterocyclic ring.

4. A method for producing a surface-treated metal member, comprising the step of:
   bringing a member having a surface of a metal into contact with the adhesive composition according to claim 1 to form an adhesive layer on the surface.

5. A method for producing a metal-resin composite body, comprising the step of:

| Example | Low molecular weight organic compound | Metal ion source | Amount of organic compound (g/L) | Amount of metal ion source (g/L) | Metal ion concentration (mmol/L) | pH | Surface of metal | Adhesive strength (MPa) | Heat treatment step | Adhesive strength after heat treatment (MPa) |
|---|---|---|---|---|---|---|---|---|---|---|
| 49 | Triazine compound a | Aluminum sulfate | 4.5 | 0.60 | 1.68 | 1 | Ni | 13.0 | 200° C. × 30 minutes | 13.9 |
| 50 | Triazine compound a | Aluminum sulfate | 4.5 | 0.60 | 1.68 | 1 | Ni | 13.0 | 250° C. × 30 minutes | 15.1 |
| 51 | Dinitro compound | Chromium (III) chloride | 2.0 | 0.60 | 0.11 | 7 | Al | 11.6 | 220° C. × 10 minutes | 12.4 |
| 52 | Dinitro compound | Chromium (III) chloride | 2.0 | 0.60 | 0.11 | 7 | Al | 11.6 | 220° C. × 30 minutes | 12.9 |
| 53 | Dinitro compound | Chromium (III) chloride | 2.0 | 0.60 | 0.11 | 7 | Al | 11.6 | 280° C. × 30 minutes | 1.4.1 | bonding a resin member onto an adhesive layer of a surface-treated metal member obtained by the method for producing a surface-treated metal member according to claim 4.

6. The adhesive composition according to claim 1, wherein the total percentage of the low molecular weight organic compound and the trivalent aluminum ion source is 50 wt % or more in the solid content of the adhesive composition.

7. The adhesive composition according to claim 1, wherein the total percentage of the low molecular weight organic compound and the trivalent aluminum ion source is 70 wt % or more in the solid content of the adhesive composition.

8. The adhesive composition according to claim 1, wherein the total percentage of the low molecular weight organic compound and the trivalent aluminum ion source is 80 wt % or more in the solid content of the adhesive composition.

9. The adhesive composition according to claim 1, wherein the total percentage of the low molecular weight organic compound and the trivalent aluminum ion source is 90 wt % or more in the solid content of the adhesive composition.

10. The adhesive composition according to claim 1, wherein the total percentage of the low molecular weight organic compound and the trivalent aluminum ion source is 95 wt % or more in the solid content of the adhesive composition.

* * * * *